(12) United States Patent
Kuwayama et al.

(10) Patent No.: US 12,420,592 B2
(45) Date of Patent: Sep. 23, 2025

(54) PNEUMATIC RADIAL TIRE FOR PASSENGER VEHICLES

(71) Applicant: BRIDGESTONE CORPORATION, Tokyo (JP)

(72) Inventors: Isao Kuwayama, Tokyo (JP); Shintaro Hatanaka, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/698,108

(22) PCT Filed: Jun. 23, 2022

(86) PCT No.: PCT/JP2022/025172
§ 371 (c)(1),
(2) Date: Apr. 3, 2024

(87) PCT Pub. No.: WO2023/105829
PCT Pub. Date: Jun. 15, 2023

(65) Prior Publication Data
US 2024/0408917 A1 Dec. 12, 2024

(30) Foreign Application Priority Data
Dec. 10, 2021 (JP) .................... 2021-201242

(51) Int. Cl.
*B60C 11/01* (2006.01)
*B60C 3/04* (2006.01)
(Continued)

(52) U.S. Cl.
CPC ........... *B60C 11/1204* (2013.01); *B60C 3/04* (2013.01); *B60C 2011/0341* (2013.01)

(58) Field of Classification Search
CPC ..... B60C 11/01; B60C 11/00; B60C 11/0304; B60C 2011/0016
See application file for complete search history.

(56) References Cited

U.S. PATENT DOCUMENTS 10,214,052 B2   2/2019   Kuwayama
10,493,803 B2   12/2019  Tomida
(Continued)

FOREIGN PATENT DOCUMENTS

EP   391300 B1 *  8/1993  ............. B60C 11/00
EP   2774780 A1   9/2014
(Continued)

OTHER PUBLICATIONS

Jun. 5, 2024, International Preliminary Report on Patentability issued in the International Patent Application No. PCT/JP2022/025172.

(Continued)

*Primary Examiner* — Cedrick S Williams
(74) *Attorney, Agent, or Firm* — KENJA IP LAW PC

(57) ABSTRACT

A pneumatic radial tire for passenger vehicles that satisfies a defined relationship between sectional width SW and outer diameter OD of the tire, and includes only two circumferential main grooves extending in a tire circumferential direction on a tread contact surface, a barycenter of the circumferential main grooves being provided to a half portion of the tire on a vehicle-mounted inward side, which is one side of the tire in a tread width direction with a tire equatorial plane as a boundary. A drop height (or ground contact length relationship, or tread gauge relationship) is also defined.

15 Claims, 7 Drawing Sheets

(51) Int. Cl.
B60C 11/12 (2006.01)
*B60C 11/03* (2006.01)

(56) References Cited

U.S. PATENT DOCUMENTS

| | | | |
|---|---|---|---|
| 10,967,680 | B2 | 4/2021 | Hiraishi |
| 2016/0001603 | A1 | 1/2016 | Kubota et al. |
| 2018/0134089 | A1* | 5/2018 | Durand-Gasselin ......................... B60C 11/1236 |
| 2022/0001706 | A1* | 1/2022 | Kuwayama ............... B60C 9/08 |

FOREIGN PATENT DOCUMENTS

| | | | | |
|---|---|---|---|---|
| JP | 2009208595 | A | * | 9/2009 |
| JP | 2011005946 | A | | 1/2011 |
| JP | 2014166824 | A | | 9/2014 |
| JP | 2015217907 | A | | 12/2015 |
| JP | 2017222243 | A | | 12/2017 |
| WO | 2011135774 | A1 | | 11/2011 |

OTHER PUBLICATIONS

Sep. 6, 2022, International Search Report issued in the International Patent Application No. PCT/JP2022/025172.
Oct. 25, 2024, search result of the Extended European Search Report issued by the European Patent Office in the corresponding European Patent Application No. 22903765.0.

* cited by examiner

| | When straight running | When camber angle is changed |
|---|---|---|
| Tire front view |  |  |
| Ground contact area |  |  |

PNEUMATIC RADIAL TIRE FOR PASSENGER VEHICLES

TECHNICAL FIELD

The present disclosure relates to a pneumatic radial tire for passenger vehicles.

BACKGROUND

As a pneumatic radial tire for passenger vehicles that improves high fuel efficiency, a narrow and large diameter pneumatic radial tire for passenger vehicles with a defined relationship between sectional width SW and tire outer diameter OD has been proposed by the applicant (for example, see Patent Literature (PTL) 1).

CITATION LIST

Patent Literature

PTL 1: WO 2011/135774 A1

SUMMARY

Technical Problem

In recent years, the development of vehicles for personal mobility has been progressing, and even among narrow and large diameter pneumatic radial tires for passenger vehicles such as mentioned above, use of tires that have a particularly small sectional width SW may be considered.

However, when the sectional width SW of a tire is small, ground contact area may deteriorate, in particular due to changes in camber angle. Further, a growing concern for environmental issues in recent years has led to greater demand for low-noise performance tires.

Therefore, it would be helpful to provide a pneumatic radial tire for passenger vehicles that is able to improve the low-noise performance of the tire while suppressing deterioration of the ground contact area when the camber angle changes.

Solution to Problem

Primary features of the present disclosure are as follows.

(1) A pneumatic radial tire for passenger vehicles, comprising a tread, wherein
sectional width SW of the tire is less than 165 mm,
a ratio SW/OD of the sectional width SW to outer diameter OD of the tire is 0.26 or less, or the sectional width SW (mm) and the outer diameter OD (mm) of the tire satisfy the relational equation OD (mm)$\geq -0.0187 \times$ SW (mm)$^2 + 9.15 \times$ SW (mm)$-380$ (mm),
in a tire width direction cross-section, under reference conditions where the tire is mounted on a nm, filled with a prescribed internal pressure, and unloaded, when a straight line passing through a point on a tread surface on a tire equatorial plane and parallel to a tire width direction is m1, a straight line passing through ground contact edges E and parallel to the tire width direction is m2, a distance between the straight line m1 and the straight line m2 in a tire radial direction is a drop height $L_{CR}$, and a tread width of the tire is TW, a ratio $L_{CR}/TW$ is greater than 0.045,
a contact surface of the tread has only two circumferential main grooves extending in a tire circumferential direction, and
a barycenter of the two circumferential main grooves is positioned in a half portion of the tire on a vehicle-mounted inward side, which is one side of the tire in a tread width direction with the tire equatorial plane as a boundary.

Here, "ground contact edges" refers to both edges in the tire width direction of a contact patch when the tire is mounted on the rim, filled with the prescribed internal pressure, and subjected to a maximum load.

Further, "tread width" refers to a tire widthwise distance between the ground contact edges of the tire under the reference conditions where the tire is mounted on the rim, filled with the prescribed internal pressure, and unloaded.

Further, "contact surface of the tread" refers to a surface that extends over the entire circumference of the tire circumferential direction that is in contact with a road surface when the tire is mounted on the rim, filled with the prescribed internal pressure, and subjected to the maximum load.

Further, "circumferential main groove" refers to a groove that extends in the tire circumferential direction and has a groove width (opening width) of 2 mm or greater.

Further, "barycenter . . . is positioned . . . on a vehicle-mounted inward side" refers to a virtual centerline connecting midpoints between groove centerlines of the two circumferential main grooves being positioned on the vehicle-mounted inward side, relative to the tire equatorial plane, in a tread developed view. However, when a portion of the virtual centerline intersects the tire equatorial plane, such as when the circumferential main grooves are curved, more than 50% of the extension length of the virtual centerline is positioned on the vehicle-mounted inward side, relative to the tire equatorial plane.

Further, when one of the circumferential main grooves is at a position on the tire equatorial plane, the straight line m1 is drawn along a virtual line as if there were no such circumferential main groove.

Here, "rim" refers to an approved rim of an applicable size that is currently or will be described in an industrial standard valid for the region where the tire is produced and used, in Japan the JATMA YEAR BOOK of the Japan Automobile Tyre Manufacturers Association (JATMA), in Europe the STANDARDS MANUAL of The European Tyre and Rim Technical Organisation (ERTRO), and in the U.S.A. the YEAR BOOK of The Tire and Rim Association, Inc. (TRA). An approved rim in the STANDARDS MANUAL of ETRTO is the Measuring Rim, and in the YEAR BOOK of TRA is the Design Rim. That is, the "rim" of a "wheel" above includes not only current sizes but also sizes that may be included in the industrial standard in the future. An example of a size to be described in the future is a size described in "FUTURE DEVELOPMENTS" in the 2013 publication of ETRTO. However, in a case of a size not described in the industrial standards above, a rim having a width that corresponds to tire bead width is referenced.

Further, "prescribed internal pressure" refers to an air pressure (maximum air pressure) corresponding to a maximum load capability of a single wheel of an applicable size and ply rating described in the industrial standard of JATMA or the like. In the case of a size that is not described in the industrial standards above, "prescribed internal pressure" refers to an air pressure (maximum air pressure) corresponding to a maximum load capability prescribed for each vehicle on which the tire is mounted.

Further, "maximum load" refers to a load corresponding to the maximum load capability mentioned above.

(2) A pneumatic radial tire for passenger vehicles, comprising a tread, wherein
sectional width SW of the tire is less than 165 mm,
a ratio SW/OD of the sectional width SW to outer diameter OD of the tire is 0.26 or less, or the sectional width SW (mm) and the outer diameter OD (mm) of the tire satisfy the relational equation OD (mm)≥−0.0187× SW (mm)$^2$+9.15×SW (mm)−380 (mm),
ground contact length on a tire equatorial plane is longer than an average value of ground contact lengths at positions 20% of ground contact width inward in a tire width direction from both ground contact edges,
a contact surface of the tread has only two circumferential main grooves extending in a tire circumferential direction, and
a barycenter of the two circumferential main grooves is positioned in a half portion of the tire on a vehicle-mounted inward side, which is one side of the tire in a tread width direction with the tire equatorial plane as a boundary.

Here, "ground contact length" refers to a tire circumferential direction length of the contact patch when the tire is mounted on the rim, filled with the prescribed internal pressure, and loaded with the maximum load, and "ground contact width" refers to a maximum width of the contact patch in the tire width direction when the tire is mounted on the rim, filled with the prescribed internal pressure, and loaded with the maximum load.

When one of the circumferential main grooves is at a position where the ground contact length is to be measured, the ground contact length is measured along a virtual line as if there were no such circumferential main groove.

(3) A pneumatic radial tire for passenger vehicles, comprising a tread, wherein
sectional width SW of the tire is less than 165 mm,
a ratio SW/OD of the sectional width SW to outer diameter OD of the tire is 0.26 or less, or the sectional width SW (mm) and the outer diameter OD (mm) of the tire satisfy the relational equation OD (mm)≥−0.0187× SW (mm)$^2$+9.15×SW (mm)−380 (mm),
gauge of the tread on a tire equatorial plane is greater than an average value of gauges of the tread at positions 20% of ground contact width inward in a tire width direction from both ground contact edges,
a contact surface of the tread has only two circumferential main grooves extending in a tire circumferential direction, and
a barycenter of the two circumferential main grooves is positioned in a half portion of the tire on a vehicle-mounted inward side, which is one side of the tire in a tread width direction with the tire equatorial plane as a boundary.

Here, "gauge" refers to the gauge from an outermost reinforcement layer in the tire radial direction to the tread surface among the reinforcement layers arranged outward from the crown portion of the carcass in the tire radial direction, and is measured in a normal line direction relative to the tread surface under the reference conditions. Further, when the location where the gauge is to be measured includes one of the circumferential main grooves, the gauge is measured along a virtual line as if there were no such circumferential main groove.

Hereinafter, "tread edge" means the ground contact edges described above. Further, "diameter" of a hole-shaped sipe means maximum diameter in a planar view.

Advantageous Effect

According to the present disclosure, a pneumatic radial tire for passenger vehicles is provided that is able to improve the low-noise performance of the tire while suppressing deterioration of the ground contact area when the camber angle changes.

BRIEF DESCRIPTION OF THE DRAWINGS

In the accompanying drawings.

DETAILED DESCRIPTION

Hereinafter, embodiments of the present disclosure are illustratively described in detail, with reference to the drawings.

Figure 1:
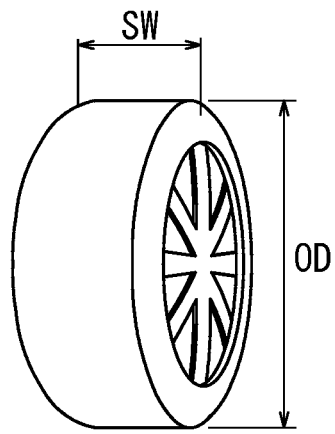
FIG. 1 is a schematic diagram illustrating sectional width SW and outer diameter OD of a tire.

FIG. 1 is a schematic diagram illustrating sectional width SW and outer diameter OD of a tire.

The pneumatic radial tire for passenger vehicles (hereinafter also referred to simply as "tire") according to an embodiment of the present disclosure has a sectional width SW of less than 165 (mm), and a ratio SW/OD of the sectional width SW to the outer diameter OD of the tire is 0.26 or less, forming a narrow width and large diameter shape. By making the sectional width SW of the tire narrow, relative to the outer diameter OD of the tire, air resistance may be reduced, and by making the outer diameter OD of the tire large, relative to the sectional width SW of the tire, deformation of tread rubber in the vicinity of the contact patch of the tire may be controlled and rolling resistance may be reduced. Accordingly, fuel efficiency of the tire may be improved. The ratio SW/OD is preferably 0.25 or less, and more preferably 0.24 or less.

The ratio above is preferably satisfied when the internal pressure of the tire is 200 kPa or greater, more preferably satisfied when the internal pressure of the tire is 220 kPa or greater, and even more preferably satisfied when the internal pressure of the tire is 280 kPa or greater. This allows rolling resistance to be reduced. On the other hand, the ratio above is preferably satisfied when the internal pressure of the tire is 350 kPa or less. This allows ride comfort to be improved.

Here, the sectional width SW of the tire is preferably 105 mm to 145 mm, and more preferably 115 mm to 135 mm.

Further, an aspect ratio of the tire when the sectional width SW and the outer diameter OD of the tire satisfy the ratio above is preferably 45 to 70, and more preferably 45 to 65.

The tire is not particularly limited to a specific size. Example tire sizes include 105/50R16, 115/50R17, 125/55R20, 125/60R18, 125/65R19, 135/45R21, 135/55R20, 135/60R17, 135/60R18, 135/60R19, 135/65R19, 145/45R21, 145/55R20, 145/60R16, 145/60R17, 145/60R18, 145/60R19, 145/65R19, 155/45R18, 155/45R21, 155/55R18, 155/55R19, 155/55R21, 155/60R17, 155/65R18, 155/70R17, and 155/70R19.

Alternatively, the sectional width SW of the tire is less than 165 mm, and the sectional width SW (mm) and the outer diameter OD (mm) of the tire satisfy the following relational equation:

$$OD(mm) \geq -0.0187 \times SW(mm)^2 + 9.15 \times SW(mm) - 380$$

That is, the tire has a narrow width and a large diameter.

Satisfying the relational equation above reduces air resistance and reduces rolling resistance, thereby improving fuel efficiency of the tire.

According to a third aspect, the sectional width SW and the outer diameter OD of the tire, in addition to satisfying the relational equation above, are such that the ratio SW/OD is preferably 0.26 or less, more preferably 0.25 or less, and even more preferably 0.24 or less. This allows fuel efficiency of the tire to be further improved.

The relational equation and/or the ratio are preferably satisfied when the internal pressure of the tire is 200 kPa or greater, more preferably when the internal pressure of the tire is 220 kPa or greater, and even more preferably when the internal pressure of the tire is 280 kPa or greater. This allows rolling resistance to be reduced. On the other hand, the relational equation and/or the ratio are preferably satisfied when the internal pressure of the tire is 350 kPa or less. This allows ride comfort to be improved.

Here, the sectional width SW of the tire is preferably 105 mm to 145 mm, and more preferably 115 mm to 135 mm.

Further, the aspect ratio of the tire when the sectional width SW and the outer diameter OD of the tire satisfy the relational equation above is preferably 45 to 70, and more preferably 45 to 65.

The tire is not particularly limited to a specific size. Example tire sizes include 105/50R16, 115/50R17, 125/55R20, 125/60R18, 125/65R19, 135/45R21, 135/55R20, 135/60R17, 135/60R18, 135/60R19, 135/65R19, 145/45R21, 145/55R20, 145/60R16, 145/60R17, 145/60R18, 145/60R19, 145/65R19, 155/45R18, 155/45R21, 155/55R18, 155/55R19, 155/55R21, 155/60R17, 155/65R18, 155/70R17, and 155/70R19.

The tire according to the present embodiment is a pneumatic radial tire for passenger vehicles. This tire is particularly suitable for use as a tire mounted on a vehicle for personal mobility.

Figure 2:
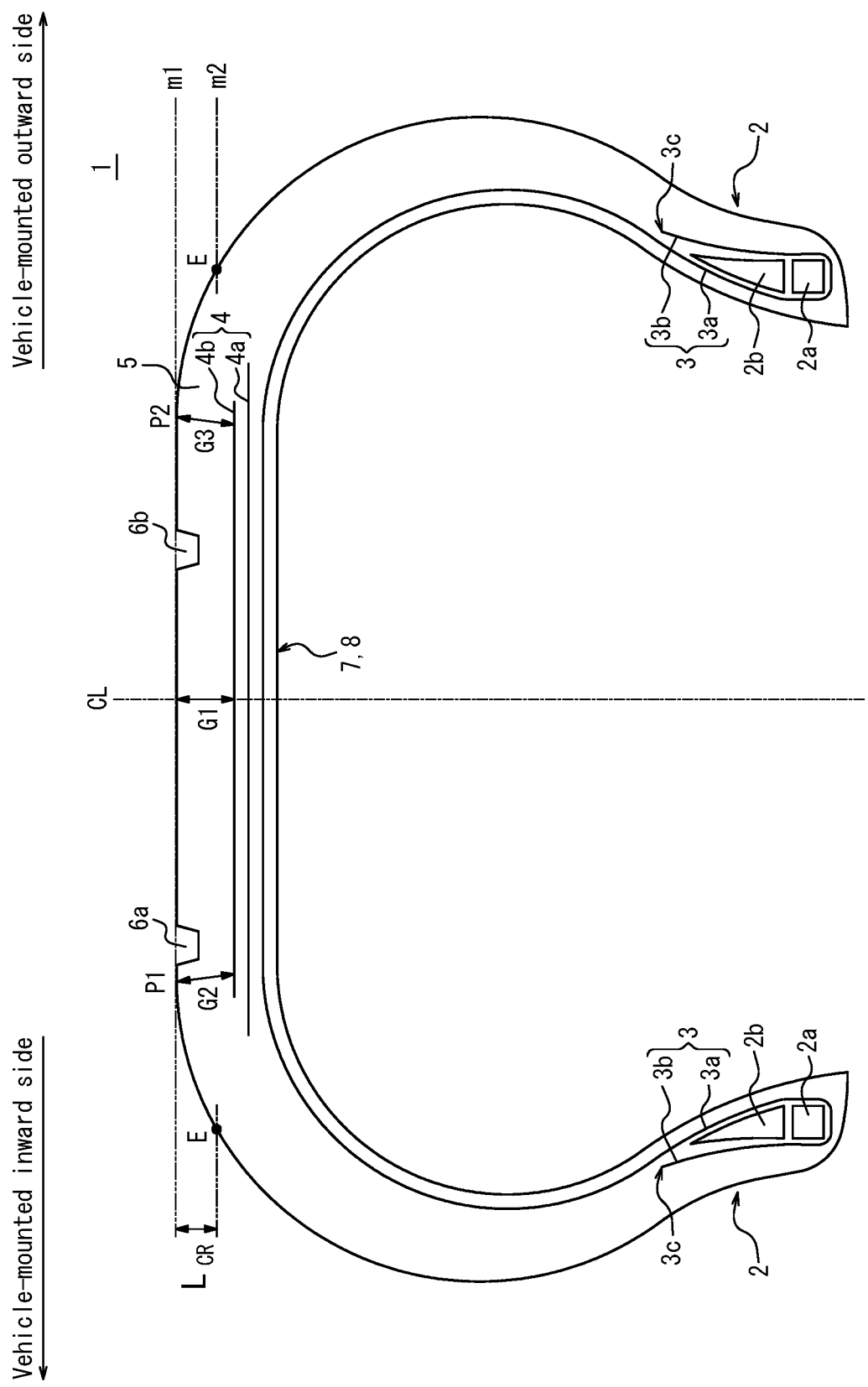
FIG. 2 is a tire width direction cross-section diagram of a pneumatic radial tire for passenger vehicles according to an embodiment of the present disclosure.

FIG. 2 is a tire width direction cross-section diagram of the pneumatic radial tire for passenger vehicles according to an embodiment of the present disclosure. FIG. 2 illustrates a tire width direction cross-section under reference conditions, where the tire is mounted on a rim, filled to a prescribed internal pressure, and unloaded. As illustrated in FIG. 2, the tire 1 includes a carcass 3 consisting of plies of radially arranged cords toroidally extending between a pair of bead portions 2. Further, the tire 1 includes a belt 4 consisting of two belt layers 4a, 4b in the illustrated example, and a tread 5, in this order, outward from the carcass 3 in the tire radial direction.

In this example, a bead core 2a is embedded in each of the pair of bead portions 2. According to the present disclosure, a cross-sectional shape and material of the bead core 2a are not particularly limited, and may have a structure normally used in a pneumatic radial tire for passenger vehicles. According to the present disclosure, the bead core 2a may be divided into a plurality of small bead cores. Alternatively, according to the present disclosure, the structure need not include the bead core 2a.

The tire 1 in the illustrated example includes a bead filler 2b that has an approximately triangular shape in cross-section, disposed outward from the bead core 2a in the tire radial direction. The cross-sectional shape of the bead filler 2b is not limited to this example, and the material of the bead filler 2b is also not particularly limited. Alternatively, the tire may be made lighter by not including the bead filler 2b.

According to the present embodiment, the tire 1 may have a structure that includes a rim guard. Further, according to the present embodiment, the bead portion 2 may further include an additional member such as a rubber layer, a cord layer, or the like for reinforcement or other purposes. Such an additional member may be provided at various positions with respect to the carcass 3 and the bead filler 2b.

In the example illustrated in FIG. 2, the carcass 3 consists of a single carcass ply. However, according to the present disclosure, the number of carcass plies is not particularly limited and may be two or more. Further, in the example illustrated in FIG. 2, the carcass 3 includes a toroidally extending carcass body portion 3a that spans between the pair of the bead portions 2 and turn-up portions 3b that are turned up from the carcass body portion 3a around the bead cores 2a. However, according to the present disclosure, the carcass turn-up portions 3b may be wrapped around the bead cores 2a, or may be sandwiched between a number of divided small bead cores. According to the illustrated example, ends 3c of the carcass turn-up portions 3b are positioned outward in the tire radial direction from an outermost end in the tire radial direction of the bead fillers 2b and inward in the tire radial direction from a tire maximum width position. This allows reduction of the weight of the tire while maintaining rigidity of the sidewall portion. However, according to the present disclosure, the ends 3c of the carcass turn-up portions 3b may be positioned inward in the tire radial direction from the outermost end in the tire radial direction of the bead filler 2b, or outward in the tire radial direction from the tire maximum width position. Alternatively, the ends 3c of the carcass turn-up portions 3b may be an envelope structure, positioned inward in the tire width direction of ends of the belt 4 (for example, ends of the belt layer 4b) between the carcass body portion 3a and the belt 4 in the tire radial direction. Further, in a case where the carcass 3 is formed of a plurality of carcass plies, the positions of the ends 3c of the carcass turn-up portions 3b (for example, in the tire radial position) may be the same or different among the carcass plies. The number of cords in the carcass 3 is not particularly limited, and may be in a range of 20 cords to 60 cords per 50 mm, for example. Further, a carcass line may adopt various structures. For example, a carcass maximum width position in the tire radial direction may be closer to either the bead portions 2 or the tread 5. For example, the carcass maximum width position may be in a range of 50% to 90% of a tire section height, outward in the tire radial direction from a bead base line. The above term "radially arranged" indicates at least 85° to the tire circumferential direction, preferably 90° to the tire circumferential direction.

The tire according to the present embodiment preferably includes at least one inclined belt layer consisting of a rubberized layer of cords extending at an angle to the tire circumferential direction, and two layers is most preferable for the combination of weight reduction and suppression of contact patch distortion. From the viewpoint of weight reduction, one belt layer may be used, and from the viewpoint of suppressing distortion of the contact patch, three or more layers may be used. In the example illustrated in FIG. 2, of the two belt layers 4a and 4b, the width in the tire width direction of the belt layer 4b outward in the tire radial direction is smaller than the width in the tire width direction of the belt layer 4a inward in the tire radial direction. However, the width in the tire width direction of the belt layer 4b outward in the tire radial direction may be greater than or the same as the width in the tire width direction of the belt layer 4a inward in the tire radial direction. The width in the tire width direction of the belt layer that has the greatest width in the tire width direction (the belt layer 4a in the illustrated example) is preferably 90% to 115% of the ground contact width, and more preferably 100% to 105% of the ground contact width. Here, "ground contact width" refers to the distance in the tire width direction between the ground contact edges E described above.

According to the present embodiment, metal cords, in particular steel cords, are most preferable as belt cords of the belt layers 4a, 4b, but non-metal, for example, organic fiber cords (such as Kevlar® (Kevlar is a registered trademark in Japan, other countries, or both)) may be used. The steel cords may include steel as a main component, and may contain various micro inclusions such as carbon, manganese, silicon, phosphorus, sulfur, copper, and chromium. According to the present embodiment, the belt cords of the belt layers 4a, 4b may be monofilament cords, cords with a plurality of filaments drawn together, or cords with a plurality of filaments twisted together. Various twist structures may be adopted, including cross-section structure, twist pitch, twist direction, and distance between adjacent filaments. Cords obtained by twisting filaments of different materials may also be used, which may employ various twist structures such as single twist, layer twist, and multi twist, without being limited to any particular cross-section structure.

According to the present embodiment, an inclination angle of the belt cords of the belt layers 4a, 4b is preferably 10° or more with respect to the tire circumferential direction. According to the present embodiment, the inclination angle of the belt cords of the belt layers 4a, 4b is preferably a high angle, specifically 20° or more, preferably 35° or more, and more preferably in a range of 55° to 85° with respect to the tire circumferential direction. By setting the inclination angle to 20° or more (preferably 35° or more), the rigidity with respect to the tire width direction may be increased, and steering stability, particularly when cornering, may be improved. Further, shearing deformation of the inter-layer rubber may be reduced, and rolling resistance may be reduced.

In the illustrated example, the tread rubber of the tread 5 consists of one layer. However, according to the present embodiment, the tread rubber of the tread 5 may be formed by a plurality of different rubber layers stacked in the tire radial direction. The plurality of rubber layers may be different from one another in terms of tangent loss, modulus, hardness, glass transition temperature, material, or the like. Further, ratios of thicknesses of the plurality of rubber layers in the tire radial direction may vary in the tire width direction. Further, circumferential main groove bottoms and the like may be composed of a rubber layer different from that in a surrounding region. Further, the tread rubber of the tread 5 may be formed by a plurality of different rubber layers in the tire width direction. The plurality of rubber layers may be different from one another in terms of tangent loss, modulus, hardness, glass transition temperature, material, or the like. Further, ratios of thicknesses of the plurality of rubber layers in the tire width direction may vary in the tire radial direction. Further, rubber layers in a limited region, such as in the vicinity of the circumferential main grooves alone, in the vicinity of the ground contact edges E alone, in the shoulder land portions alone, or in the center land portion, may be formed as rubber layers different from the surroundings.

Figure 3:
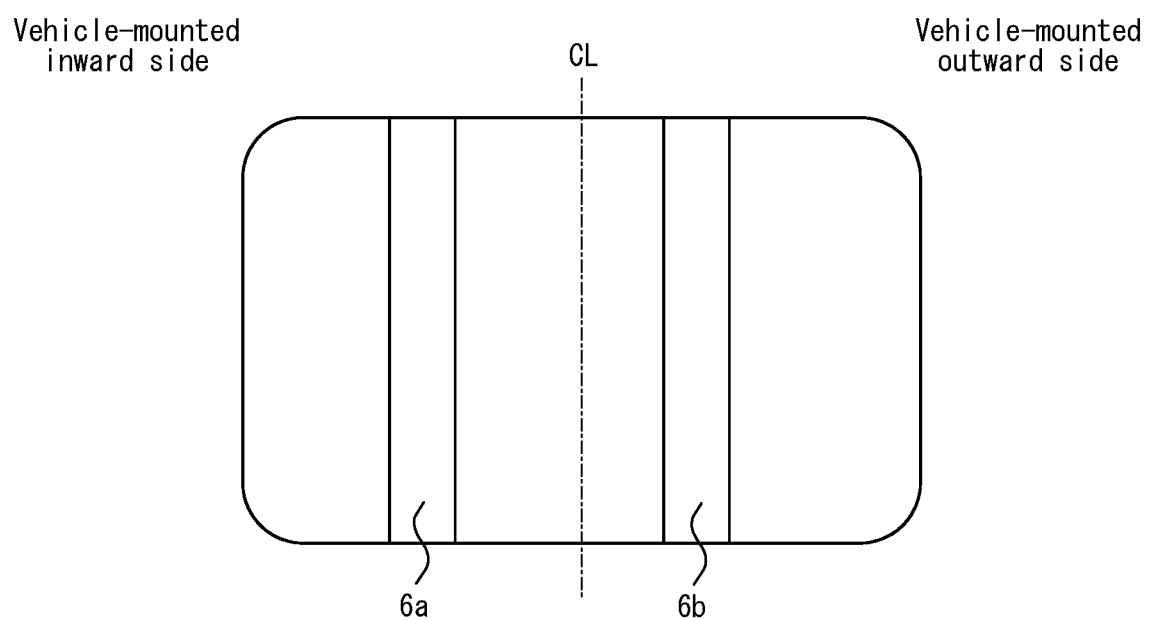
FIG. 3 is a developed view illustrating a tread pattern of a pneumatic radial tire for passenger vehicles according to an embodiment of the present disclosure.

FIG. 3 is a developed view illustrating a tread pattern of the pneumatic radial tire for passenger vehicles according to an embodiment of the present disclosure.

As illustrated in FIG. 2 and FIG. 3, in this example, the tire 1 has only two circumferential main grooves 6 extending in the tire circumferential direction on the contact surface of the tread 5. In this example, the circumferential main grooves 6 extend straight in the tire circumferential direction, but may extend in a zigzag shape or curved shape. The groove width (opening width) of the circumferential main grooves 6 is not particularly limited, and may be 2 mm to 5 mm, for example. The groove depth (maximum depth) of the circumferential main grooves 6 is not particularly limited, and may be 3 mm to 6 mm, for example. Here, according to the present embodiment, the barycenter of the circumferential main grooves 6 is positioned in the half portion of the tire on the vehicle-mounted inward side, which is one side of the tire in the tread width direction with the tire equatorial plane CL as a boundary. In the illustrated example, one circumferential main groove 6a is provided on one side in the tire width direction (vehicle-mounted inward side) and the other circumferential main groove 6b is provided on the other side in the tire width direction (vehicle-mounted outward side). The circumferential main groove 6a and the circumferential main groove 6b have the same groove width, and a clearance distance between the circumferential main groove 6a and the tire equatorial plane in the tire width direction is greater than a clearance distance between the circumferential main groove 6b and the tire equatorial plane in the tire width direction, and therefore the barycenter of the two circumferential main grooves 6 is positioned on the vehicle-mounted inward side.

In the illustrated example, the tire 1 does not have a width direction groove extending in the tire width direction on the contact surface of the tread 5, but the tire 1 may have one or more width direction grooves.

The tire 1 according to the present embodiment includes an inner liner 8 on an inner surface 7 of the tire (also referred to simply as the tire inner surface 7). Thickness of the inner liner 8 is preferably about 1.5 mm to 2.8 mm. This may effectively reduce cabin noise in a range of 80 Hz to 100 Hz. An air permeability coefficient of a rubber composition of the inner liner 8 is preferably $1.0 \times 10^{-14}$ cc·cm/(cm$^2$·s·cmHg) or greater and $6.5 \times 10^{-10}$ cc·cm/(cm$^2$·s·cmHg) or less.

As illustrated in FIG. 2, according to the present embodiment, in the tire width direction cross-section, under the reference conditions described above, when a straight line passing through a point on the tread surface on the tire equatorial plane CL and parallel to the tire width direction is m1, a straight line passing through the ground contact edges E and parallel to the tire width direction is m2, a distance between the straight line m1 and the straight line m2 in the tire radial direction is a drop height $L_{CR}$, and the tread width of the tire 1 is TW, a ratio $L_{CR}/TW$ is greater than 0.045 (Configuration 1).

The following is an explanation of effects of the pneumatic radial tire for passenger vehicles according to the present embodiment.

The pneumatic radial tire for passenger vehicles according to the present embodiment has a narrow sectional width SW of less than 165 mm, even among narrow width, large diameter tires for which the sectional width SW and the outer diameter satisfy the relational equation described above. According to such a tire, air resistance in particular may be reduced, and rolling resistance may also be reduced, thereby improving the fuel efficiency of the tire.

Figure 4:
FIG. 4 is a schematic diagram for explanation of changes in ground contact area.
Figure 4:
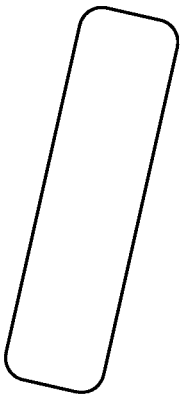
Figure 4:
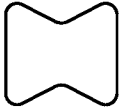
Figure 4:
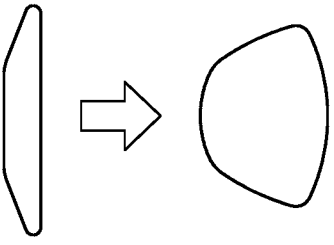

However, as schematically illustrated on a left side of the arrow in FIG. 4, with such a tire, the ground contact area may become too elongated when the camber angle changes, such as during cornering, and the ground contact area may deteriorate, resulting in reduced steering stability and the like.

To address this, first, in the tire according to the present embodiment, the ratio $L_{CR}/TW$ is greater than 0.045. This results in a tire that has a relatively round crown shape, and therefore a rounded ground contact area, with the shoulder portion having a shorter ground contact length relative to the center portion. This inhibits the ground contact area from becoming too elongated when the camber angle changes, as illustrated schematically on the right side of the arrow in FIG. 4, and suppresses deterioration of the ground contact area.

Further, the narrow width tire described above has excellent drainage to the side of the tire, and therefore even when the tire has only two circumferential main grooves 6, drainage performance may be sufficiently secured. The barycenter of the two circumferential main grooves 6 is positioned in the half portion of the tire on the vehicle-mounted inward side, which is one side of the tire in the tread width direction with the tire equatorial plane CL as a boundary, and therefore a distance until an air column resonance sound generated in the circumferential main grooves 6 reaches the outside of the vehicle is farther (compared to a case where the barycenter of the two circumferential main grooves 6 is positioned on the vehicle-mounted outward side), enabling improvement in low-noise performance due to noise attenuation.

The ratio $L_{CR}/TW$ is more preferably 0.05 or greater. This is because deterioration of the ground contact area may be further suppressed. On the other hand, from the viewpoint of reducing rolling resistance, the ratio $L_{CR}/TW$ is preferably 0.1 or less.

Further, the groove width (opening width) of the circumferential main grooves 6 is preferably 20% or less of the ground contact width, and more preferably 15% or less of the ground contact width. This is to secure an area of a land portion. For the same reason, a negative ratio of the contact surface of the tread is preferably 20% or less, and more preferably 15% or less.

Here, "negative ratio" refers to a ratio of an area of grooves having a groove width of 2 mm or greater (circumferential main groove and width direction groove) to an area of the contact surface of the tread in the tread developed view.

Further, on the vehicle-mounted inward side, the width in the tire width direction of the land portion demarcated by the tread edge and the circumferential main grooves 6 is preferably 20% or greater of the ground contact width, and more preferably 25% or greater of the ground contact width. This is to mitigate a load-bearing rate and ground contact pressure concentration in the land portion and suppress uneven wear. Further, buckling in the vicinity of the circumferential main grooves 6 may be suppressed, which has an effect of improving grounding property.

Figure 5:
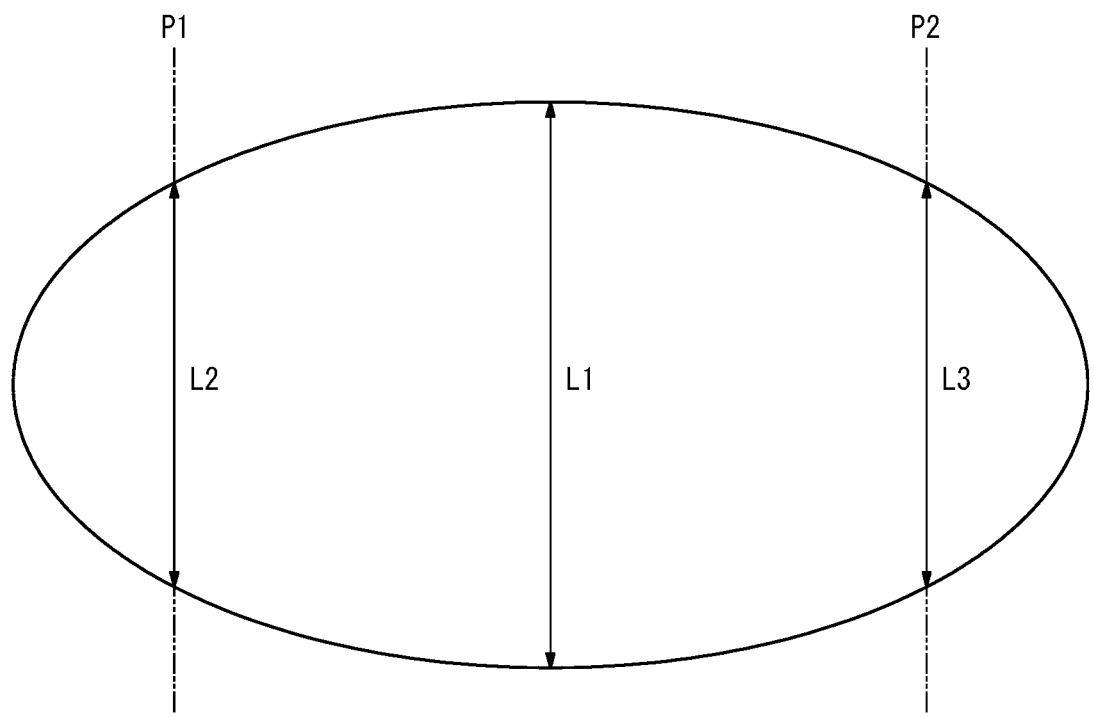
FIG. 5 is a schematic diagram for explanation of rectangular ratio.

FIG. 5 is a schematic diagram for explanation of the ground contact area. As another aspect, a ground contact length L1 on the tire equatorial plane CL is longer than an average value of ground contact lengths L2 and L3 ((L2+L3)/2) at tire width direction positions P1 and P2, which are spaced 20% of the ground contact width inward in the tire width direction from both ground contact edges E (Configuration 2). Even in this case, the ground contact area may be rounded, with the shoulder portion having a shorter ground contact length relative to the center portion. This inhibits the ground contact area from becoming too elongated when the camber angle changes, as illustrated schematically on the right side of the arrow in FIG. 4, and suppresses deterioration of the ground contact area. The ground contact length L1 is preferably 1.1 times the average of the ground contact lengths L2 and L3 or greater. On the other hand, from the viewpoint of uneven wear mitigation performance, the ground contact length L1 is preferably 1.5 times the average of the ground contact lengths L2 and L3 or less.

Further, as another aspect, as illustrated in FIG. 2, a gauge G1 of the tread on the tire equatorial plane is greater than an average value ((G2+G3)/2) of gauges G2 and G3 of the tread at positions P1 and P2, which are spaced 20% of the ground contact width inward in the tire width direction from both ground contact edges E (Configuration 3). This results in a tire that has a relatively round crown shape, and therefore a rounded ground contact area, with the shoulder portion having a shorter ground contact length relative to the center portion. This inhibits the ground contact area from becoming too elongated when the camber angle changes, as illustrated schematically on the right side of the arrow in FIG. 4, and suppresses deterioration of the ground contact area. Further, the thinner gauges at the positions P1 and P2 provide greater tread rigidity at these positions, which is advantageous for improving steering stability when cornering. The gauge G1 is preferably 1.1 times the average of the gauges G2 and G3 or greater. On the other hand, from the viewpoint of uneven wear mitigation performance, the gauge G1 is preferably 1.5 times the average value of the gauges G2 and G3 or less.

According to the present disclosure, it suffices that any one or more of the above Configurations 1 to 3 are satisfied, and any two or all three may be satisfied.

Figure 6:
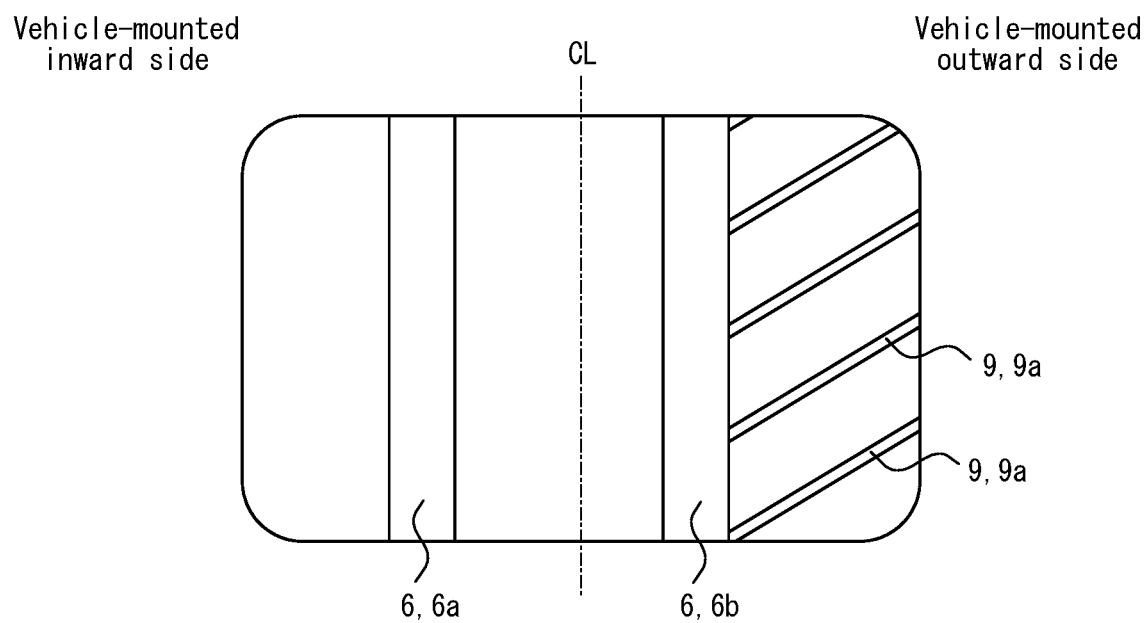
FIG. 6 is a developed view illustrating another example of a tread pattern.

FIG. 6 is a developed view illustrating another example of a tread pattern. According to this example, one or more width direction sipes 9 (9a) extending in the tread width direction or at an angle of 45° or less to the tread width direction, and/or one or more hole-shaped sipes having a diameter of 2 mm or less, are provided to the land portion on a vehicle-mounted outward side that is demarcated by one of the circumferential main grooves 6 and the tread edge (in the illustrated example, the width direction sipes 9 (9a) are provided).

According to this configuration, the compressive rigidity of the land portion may be somewhat reduced to equalize the ground contact pressure.

Here, a "sipe" of the width direction sipes has a sipe width (opening width) of less than 2 mm.

Figure 7:
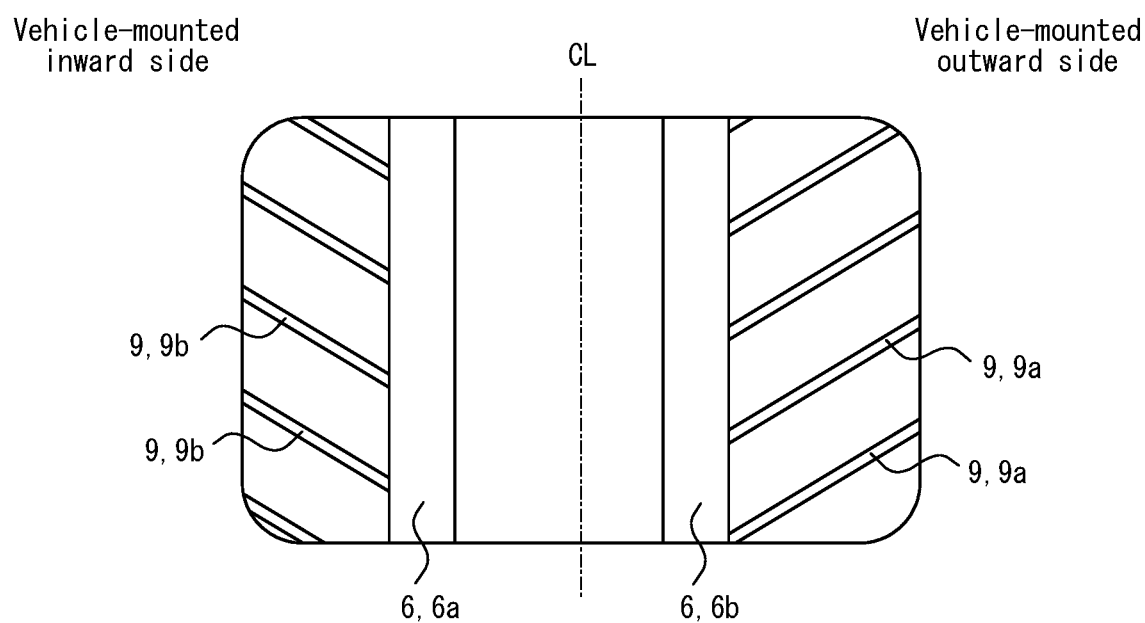
FIG. 7 is a developed view illustrating another example of a tread pattern.

FIG. 7 is a developed view illustrating another example of a tread pattern. According to this example, one or more width direction sipes 9 (9b) extending in the tread width direction or at an angle of 45° or less to the tread width direction, and/or one or more hole-shaped sipes having a diameter of 2 mm or less, are provided to the land portion on a vehicle-mounted inward side that is demarcated by one of the circumferential main grooves 6 and the tread edge (in the illustrated example, the width direction sipes 9 (9b) are provided).

This configuration is able to mitigate input of force from road surface irregularities and improve noise, vibration, and harshness (NVH) performance.

The sipe depth (maximum depth) of the width direction sipes 9a, 9b and hole-shaped sipes is not particularly limited, and may be 2 mm to 6 mm, for example. The pitch interval of the width direction sipes 9a, 9b in the tire circumferential direction is not particularly limited, and may be 10 mm to 40 mm, for example.

Figure 8:
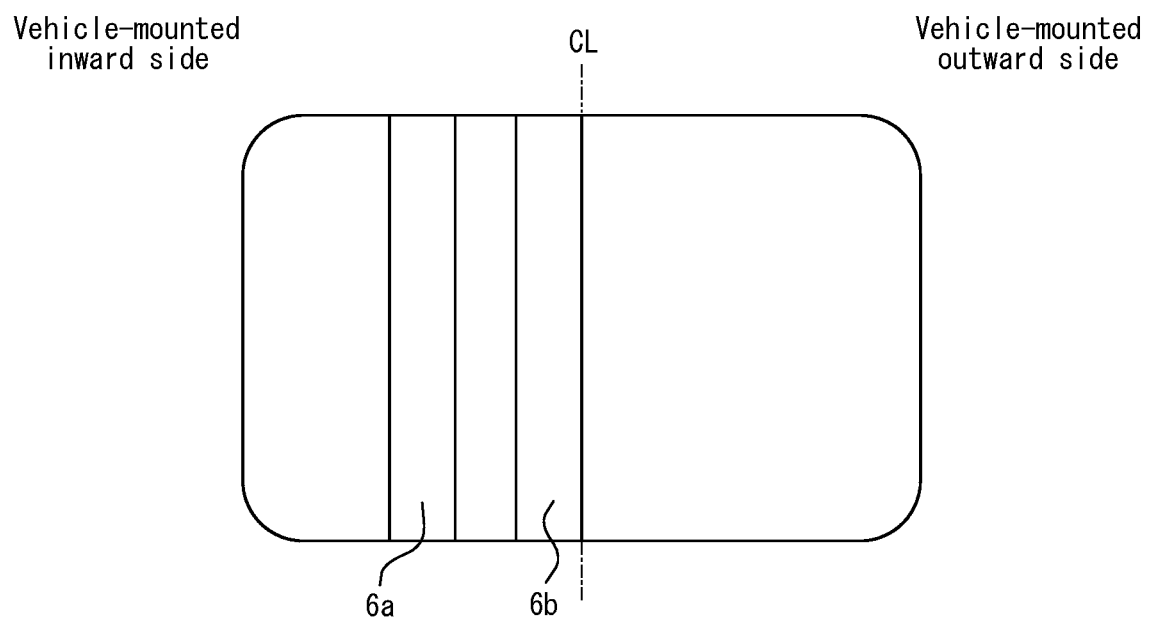
FIG. 8 is a diagram illustrating a variation of circumferential main groove arrangement.

FIG. 8 is a diagram illustrating a variation of circumferential main groove arrangement. In the example illustrated in FIG. 8, the two circumferential main grooves 6a, 6b are both provided to one half portion in the tire width direction (vehicle-mounted inward side) with the tire equatorial plane CL as a boundary. In such a case, the barycenter of the two circumferential main grooves is of course positioned on the vehicle-mounted inward side.

As a further variation, any one of the circumferential main grooves may be positioned on the tire equatorial plane. In this case, the barycenter of the two circumferential main grooves may be positioned on the vehicle-mounted inward side by providing the other circumferential main groove to one half portion in the tire width direction (vehicle-mounted inward side) with the tire equatorial plane CL as a boundary.

<Tire/Rim Assembly>

The tire/rim assembly herein consists of the pneumatic radial tire for passenger vehicles assembled on a rim. According to the tire/rim assembly, the same effects described for the pneumatic radial tire for passenger vehicles are obtainable. The internal pressure of the tire/rim assembly is preferably 200 kPa or greater, more preferably 220 kPa or greater, and even more preferably 280 kPa or greater. This is because a higher internal pressure may further reduce rolling resistance. On the other hand, the internal pressure of the tire/rim assembly is preferably 350 kPa or less. This allows ride comfort to be improved.

<Pneumatic Radial Tire for Passenger Vehicles Usage Method>

Here, the pneumatic radial tire for passenger vehicles usage method is use of the pneumatic radial tire for passenger vehicles described above. According to the pneumatic radial tire for passenger vehicles usage method, the same effects described for the pneumatic radial tire for passenger vehicles are obtainable. Use of an internal pressure of 200 kPa or greater is preferable, use of 220 kPa or greater is more preferable, and use of 280 kPa or greater is even more preferable. This is because a higher internal pressure may further reduce rolling resistance. On the other hand, use of an internal pressure of 350 kPa or less is preferable. This allows ride comfort to be improved.

As above, embodiments of the present disclosure have been described, but the present disclosure is not limited to the above embodiments. For example, in all of the above examples, the structure is symmetrical about the tire equatorial plane CL, except for the positions of the circumferential main grooves, but asymmetrical portions may be present. For example, the ground contact lengths L2 and L3 may be different from each other. For example, the gauges G2 and G3 may be different from each other. In the examples described above, the two circumferential main grooves have the same groove width, but as long as the barycenter of the two circumferential main grooves is positioned on the vehicle-mounted inward side, the groove widths may be different. Other variations and modifications are possible.

REFERENCE SIGNS LIST

1: pneumatic radial tire for passenger vehicles (tire)
2: bead portions,
2a: bead core,
2b: bead filler,
3: carcass
4: belt,
4a, 4b: belt layers,
5: tread
6: circumferential main groove,
7: tire inner surface,
8: inner liner
9: width direction sipe,
CL: tire equatorial plane

The invention claimed is:

1. A pneumatic radial tire for passenger vehicles, comprising a tread, wherein
sectional width SW of the tire is less than 165 mm,
a ratio SW/OD of the sectional width SW to outer diameter OD of the tire is 0.26 or less, or the sectional width SW (mm) and the outer diameter OD (mm) of the tire satisfy the relational equation OD (mm)≥−0.0187× SW (mm)$^2$+9.15×SW (mm)−380 (mm),
in a tire width direction cross-section, under reference conditions where the tire is mounted on a rim, filled with a prescribed internal pressure, and unloaded, when a straight line passing through a point on a tread surface on a tire equatorial plane and parallel to a tire width direction is m1, a straight line passing through ground contact edges E and parallel to the tire width direction is m2, a distance between the straight line m1 and the straight line m2 in a tire radial direction is a drop height $L_{CR}$, and a tread width of the tire is TW, a ratio $L_{CR}$/TW is greater than 0.045,
a contact surface of the tread has only two circumferential main grooves extending in a tire circumferential direction,
a barycenter of the two circumferential main grooves is positioned in a half portion of the tire on a vehicle-mounted inward side, which is one side of the tire in a tread width direction with the tire equatorial plane as a boundary, and
the only two circumferential main grooves are provided on the half portion of the tire on a vehicle-mounted inward side.

2. The pneumatic radial tire for passenger vehicles according to claim 1, wherein one or more width direction sipes extending in the tread width direction or at an angle of 45° or less to the tread width direction, and/or one or more hole-shaped sipes having a diameter of 2 mm or less, are provided to a land portion on a vehicle-mounted inward side that is demarcated by one of the circumferential main grooves and a tread edge.

3. The pneumatic radial tire for passenger vehicles according to claim 1, wherein one or more width direction sipes extending in the tread width direction or at an angle of 45° or less to the tread width direction, and/or one or more hole-shaped sipes having a diameter of 2 mm or less, are provided only to a land portion on a vehicle-mounted outward side that is demarcated by one of the circumferential main grooves and a tread edge.

4. The pneumatic radial tire for passenger vehicles according to claim 1, wherein one or more width direction sipes extending in the tread width direction or at an angle of 45° or less to the tread width direction, and/or one or more hole-shaped sipes having a diameter of 2 mm or less, are provided to a land portion on a vehicle-mounted outward side that is demarcated by one of the circumferential main grooves and a tread edge.

5. The pneumatic radial tire for passenger vehicles according to claim 4, wherein one or more width direction sipes extending in the tread width direction or at an angle of 45° or less to the tread width direction, and/or one or more hole-shaped sipes having a diameter of 2 mm or less, are provided to a land portion on a vehicle-mounted inward side that is demarcated by one of the circumferential main grooves and a tread edge.

6. A pneumatic radial tire for passenger vehicles, comprising a tread, wherein
sectional width SW of the tire is less than 165 mm,
a ratio SW/OD of the sectional width SW to outer diameter OD of the tire is 0.26 or less, or the sectional width SW (mm) and the outer diameter OD (mm) of the tire satisfy the relational equation OD (mm)≥−0.0187× SW (mm)$^2$+9.15×SW (mm)−380 (mm),
ground contact length on a tire equatorial plane is longer than an average value of ground contact lengths at positions 20% of ground contact width inward in a tire width direction from both ground contact edges,
a contact surface of the tread has only two circumferential main grooves extending in a tire circumferential direction,
a barycenter of the two circumferential main grooves is positioned in a half portion of the tire on a vehicle-mounted inward side, which is one side of the tire in a tread width direction with the tire equatorial plane as a boundary, and
the only two circumferential main grooves are provided on the half portion of the tire on a vehicle-mounted inward side.

7. The pneumatic radial tire for passenger vehicles according to claim 6, wherein one or more width direction sipes extending in the tread width direction or at an angle of 45° or less to the tread width direction, and/or one or more hole-shaped sipes having a diameter of 2 mm or less, are provided to a land portion on a vehicle-mounted inward side that is demarcated by one of the circumferential main grooves and a tread edge.

8. The pneumatic radial tire for passenger vehicles according to claim 6, wherein one or more width direction sipes extending in the tread width direction or at an angle of 45° or less to the tread width direction, and/or one or more hole-shaped sipes having a diameter of 2 mm or less, are provided only to a land portion on a vehicle-mounted outward side that is demarcated by one of the circumferential main grooves and a tread edge.

9. The pneumatic radial tire for passenger vehicles according to claim 6, wherein one or more width direction sipes extending in the tread width direction or at an angle of 45° or less to the tread width direction, and/or one or more hole-shaped sipes having a diameter of 2 mm or less, are provided to a land portion on a vehicle-mounted outward side that is demarcated by one of the circumferential main grooves and a tread edge.

10. The pneumatic radial tire for passenger vehicles according to claim 9, wherein one or more width direction sipes extending in the tread width direction or at an angle of 45° or less to the tread width direction, and/or one or more hole-shaped sipes having a diameter of 2 mm or less, are provided to a land portion on a vehicle-mounted inward side that is demarcated by one of the circumferential main grooves and a tread edge.

11. A pneumatic radial tire for passenger vehicles, comprising a tread, wherein
sectional width SW of the tire is less than 165 mm,
a ratio SW/OD of the sectional width SW to outer diameter OD of the tire is 0.26 or less, or the sectional width SW (mm) and the outer diameter OD (mm) of the tire satisfy the relational equation OD (mm)≥−0.0187× SW (mm)$^2$+9.15×SW (mm)−380 (mm),
gauge of the tread on a tire equatorial plane is greater than an average value of gauges of the tread at positions 20% of ground contact width inward in a tire width direction from both ground contact edges,
a contact surface of the tread has only two circumferential main grooves extending in a tire circumferential direction,
a barycenter of the two circumferential main grooves is positioned in a half portion of the tire on a vehicle-mounted inward side, which is one side of the tire in a tread width direction with the tire equatorial plane as a boundary, and
the only two circumferential main grooves are provided on the half portion of the tire on a vehicle-mounted inward side.

12. The pneumatic radial tire for passenger vehicles according to claim 11, wherein one or more width direction sipes extending in the tread width direction or at an angle of 45° or less to the tread width direction, and/or one or more hole-shaped sipes having a diameter of 2 mm or less, are provided to a land portion on a vehicle-mounted inward side that is demarcated by one of the circumferential main grooves and a tread edge.

13. The pneumatic radial tire for passenger vehicles according to claim 11, wherein one or more width direction sipes extending in the tread width direction or at an angle of 45° or less to the tread width direction, and/or one or more hole-shaped sipes having a diameter of 2 mm or less, are provided only to a land portion on a vehicle-mounted outward side that is demarcated by one of the circumferential main grooves and a tread edge.

14. The pneumatic radial tire for passenger vehicles according to claim 11, wherein one or more width direction sipes extending in the tread width direction or at an angle of 45° or less to the tread width direction, and/or one or more hole-shaped sipes having a diameter of 2 mm or less, are provided to a land portion on a vehicle-mounted outward side that is demarcated by one of the circumferential main grooves and a tread edge.

15. The pneumatic radial tire for passenger vehicles according to claim 14, wherein one or more width direction sipes extending in the tread width direction or at an angle of 45° or less to the tread width direction, and/or one or more hole-shaped sipes having a diameter of 2 mm or less, are provided to a land portion on a vehicle-mounted inward side that is demarcated by one of the circumferential main grooves and a tread edge.

* * * * *